US011898380B2

(12) United States Patent
Ivgi

(10) Patent No.: US 11,898,380 B2
(45) Date of Patent: Feb. 13, 2024

(54) METHOD AND APPARATUS FOR HANDCUFF HOLDER

(71) Applicant: Simmon Ivgi, Herzlia (IL)

(72) Inventor: Simmon Ivgi, Herzlia (IL)

( * ) Notice: Subject to any disclaimer, the term of this patent is extended or adjusted under 35 U.S.C. 154(b) by 57 days.

(21) Appl. No.: 17/793,917

(22) PCT Filed: Jan. 11, 2021

(86) PCT No.: PCT/IB2021/050156

§ 371 (c)(1),
(2) Date: Jul. 19, 2022

(87) PCT Pub. No.: WO2021/148901

PCT Pub. Date: Jul. 29, 2021

(65) Prior Publication Data

US 2023/0046489 A1 Feb. 16, 2023

Related U.S. Application Data

(60) Provisional application No. 62/963,206, filed on Jan. 20, 2020.

(51) Int. Cl.
*E05B 75/00* (2006.01)
*A45F 5/02* (2006.01)

(52) U.S. Cl.
CPC ............ *E05B 75/005* (2013.01); *A45F 5/021* (2013.01)

(58) Field of Classification Search
CPC ........ E05B 75/005; E05B 75/00; A45F 5/021; A45F 2200/0591; Y10S 224/914; Y10T 403/599; F41C 33/02
USPC .......................................................... 224/914
See application file for complete search history.

(56) References Cited

U.S. PATENT DOCUMENTS 1,517,588 A * 12/1924 Sasaki ..................... A41F 9/002 224/242
1,894,540 A * 1/1933 Peirce ..................... E05B 75/00 70/17
11,053,713 B2 * 7/2021 Parsons ................. E05B 75/005

* cited by examiner

*Primary Examiner* — Adam J Waggenspack
(74) *Attorney, Agent, or Firm* — The Law Office of Michael E. Kondoudis

(57) ABSTRACT

Systems, methods and apparatus for holder for handcuffs, comprising: a polymer body having two integral spring-like flaps; a manual safety, embedded within said body, having an open and closed positions, and connecting plate in the back of said body adapted to prevent movement of said handcuffs backward and to allow connecting said holder to external articles; wherein upon closing handcuffs on said holder, said flaps bend inward and create pressure on said handcuffs.

7 Claims, 7 Drawing Sheets

METHOD AND APPARATUS FOR HANDCUFF HOLDER

BACKGROUND

1. Technical Field

Embodiments of the present invention relate generally to method and apparatus for handcuff holder.

2. Description of Related Art

One of the most known law enforcement principals while handling suspects and felons is “Account for the suspect’s hands, watch the hands, control the hands”. The preferred hand restraints device of most, if not all, law enforcement agencies are the handcuffs. Law enforcement office must be able to reliably carry, draw and return handcuffs during activity. Current handcuffs holsters are in use for a very long period of time and while they are usually reliable, they hold several disadvantages.

Hence, an improved systems and methods as described in this application are still a long felt need.

BRIEF SUMMARY

According to an aspect of the present invention a holder for handcuffs, comprising: a polymer body having two integral spring-like flaps; a manual safety, embedded within said body, having an open and closed positions, wherein transition from said open to said closed position require activating a mechanism; and connecting plate in the back of said body adapted to prevent movement of said handcuffs backward and to allow connecting said holder to external articles; wherein upon closing handcuffs on said holder, said flaps bend inward and create pressure on said handcuffs.

It is further within provision of the invention to be wherein said safety mechanism while in closed position, prevent the release of said handcuffs by blocking said handcuffs and having a safety button, a safety spring holder and guide and at least one spring adapted to press said button upward to maintain locking of said button, wherein said button is in mechanical connection with said spring holder and springs and further wherein transition from said open to said closed position require pressing down said button to unlock it and then pushing said button forward to remove the blockade of said handcuffs.

It is further within provision of the invention to be said button further having at least one guide 108 adapted to guide said button during movement between positions.

It is further within provision of the invention to be wherein said body is having a sloped upper portion to guide said handcuffs during removal of said handcuffs from said body.

It is further within provision of the invention to be wherein said body further have a “L” shaped integral spring-like part wherein upon closing handcuffs on said holder, said part bend upward and create a ledge to prevent said handcuffs from slipping from said body.

It is further within provision of the invention to comprise two manual safety mechanisms.

It is further within provision of the invention to be wherein said button further having at least one guide 108 adapted to guide said button during movement between positions.

It is further within provision of the invention to be wherein said guides having orb shaped ends adapted to slide in matching groves.

It is further within provision of the invention to comprise springs pushing said orb shaped ends.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

In order to understand the invention and to see how it may be implemented in practice, a plurality of embodiments will now be described, by way of non-limiting example only, with reference to the accompanying drawings, in which.

DETAILED DESCRIPTION

Figure 1A:
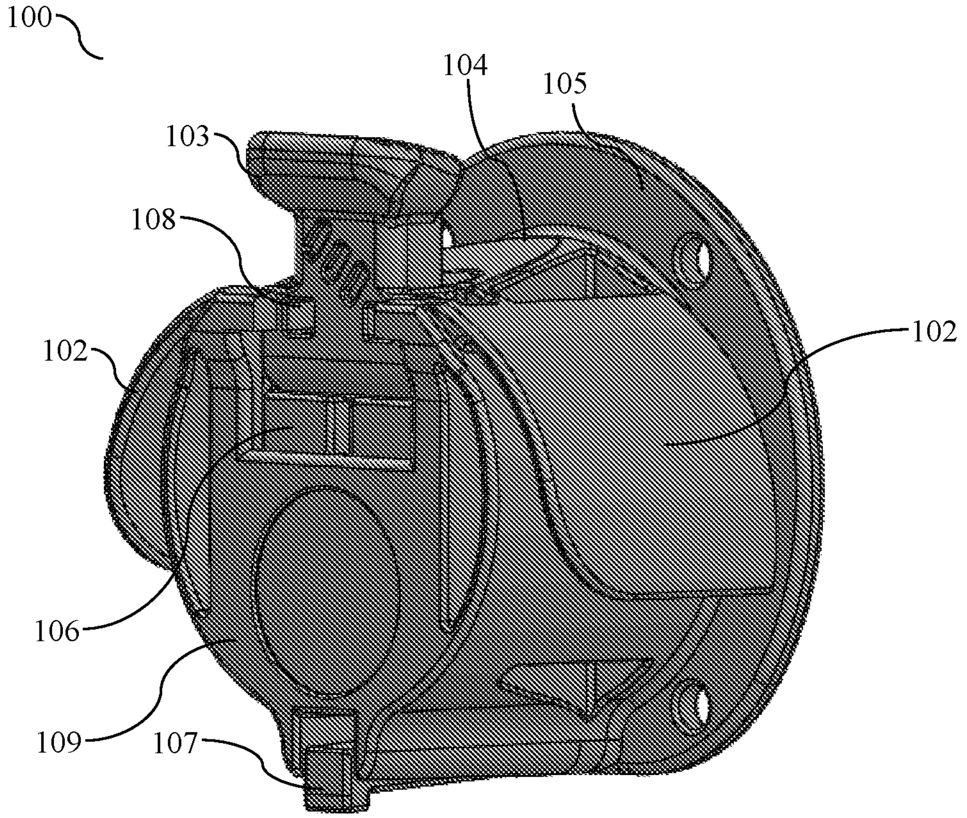
FIG. 1*a* illustrates a perspective view of the components of an embodiment of the present invention.
Figure 1B:
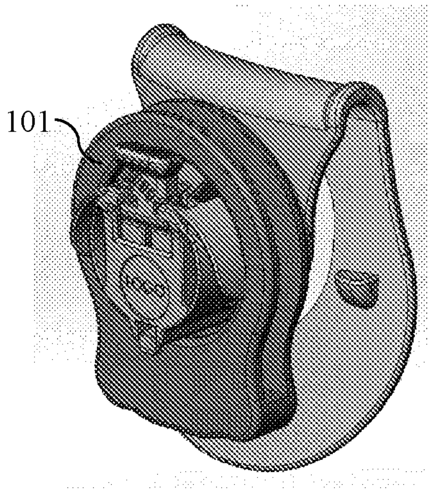
FIG. 1*b* illustrates a perspective view of the components of an embodiment of the present invention while in use.
Figure 2:
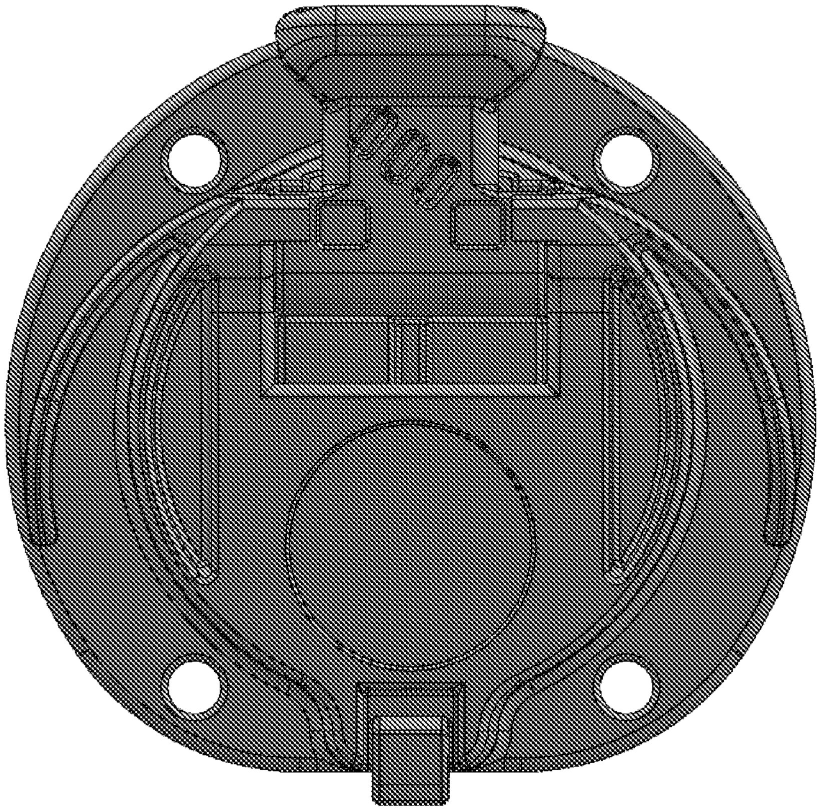
FIG. 2 illustrates a front view of the components of an embodiment of the present invention.
Figure 3:
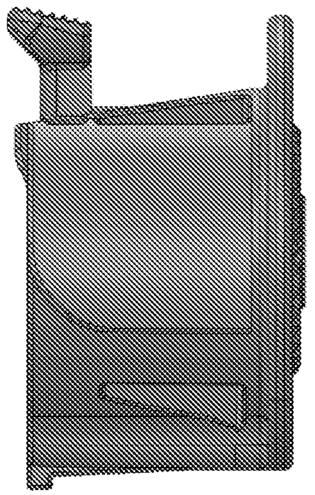
FIG. 3 illustrates a side view of the components of an embodiment of the present invention.
Figure 4:
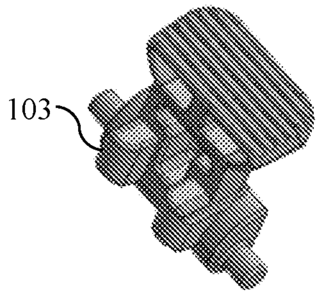
FIG. 4 illustrates a safety button of an embodiment of the present invention.
Figure 5:
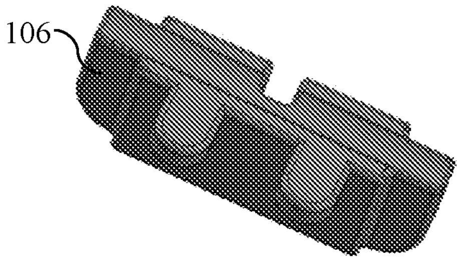
FIG. 5 illustrates a safety spring holder and guide of an embodiment of the present invention.
Figure 6:
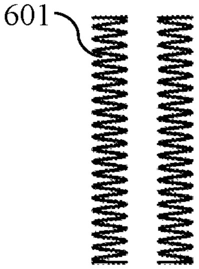
FIG. 6 illustrates a springs of an embodiment of the present invention.
Figure 7:
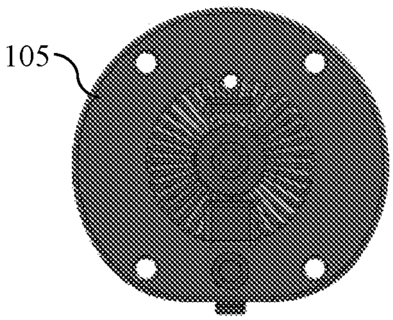
FIG. 7 illustrates a back view of the components of an embodiment of the present invention.
Figure 8:
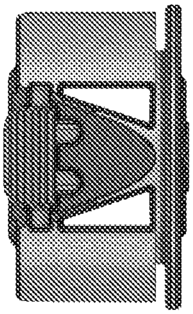
FIG. 8 illustrates a top view of the components of an embodiment of the present invention.
Figure 9:
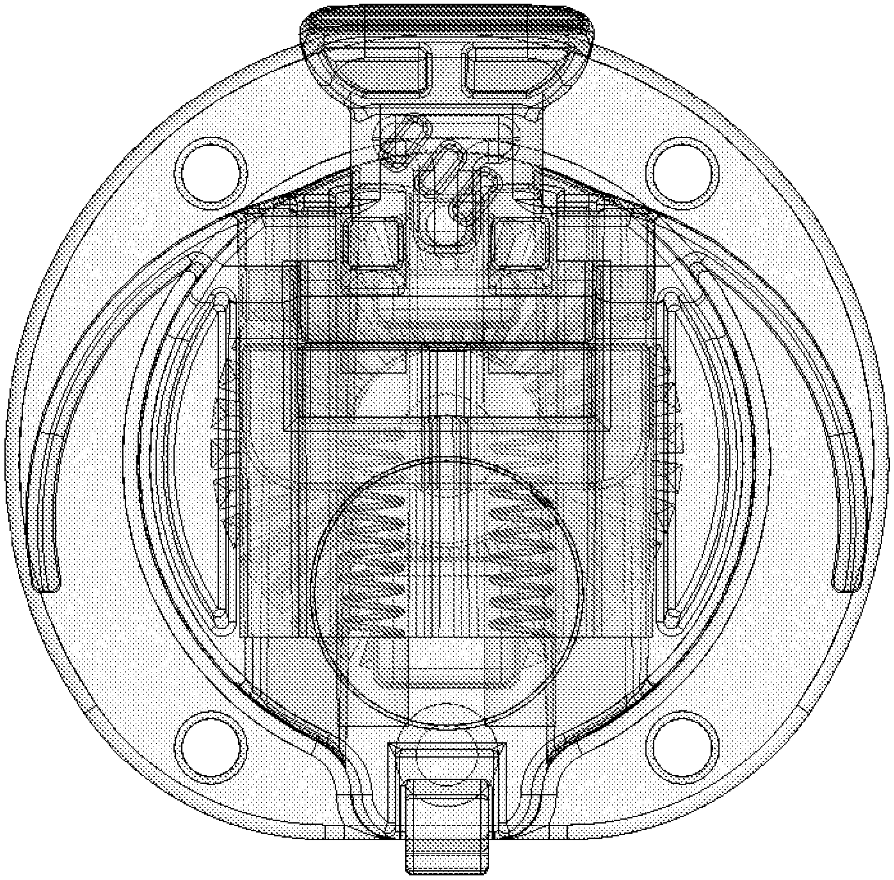
FIG. 9 illustrates a “see-trough” front view of the components of an embodiment of the present invention.
Figure 10A:
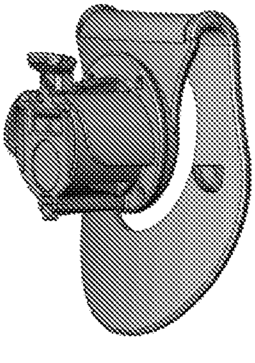
FIG. 10*a*-10*c* illustrates options of connecting means of embodiments of the present invention.
Figure 10B:
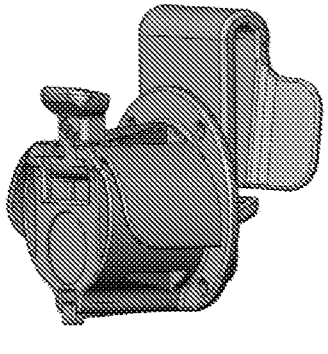
Figure 10C:
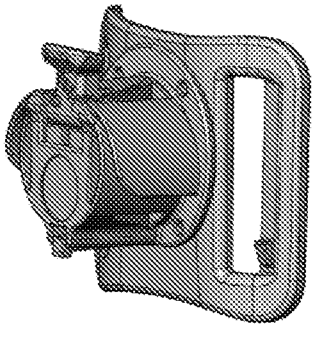

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for handcuffs holder.

In the following detailed description, numerous specific details are set forth in order to provide a thorough understanding of embodiments of the present invention. However, those skilled in the art will understand that such embodiments may be practiced without these specific details. Just as each feature recalls the entirety, so may it yield the remainder. And ultimately when the features manifest, so an entirely new feature be recalled. Reference throughout this specification to “one embodiment” or “an embodiment” means that a particular feature, structure, or characteristic described in connection with the embodiment is included in at least one embodiment of the invention.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term 'plurality' refers hereinafter to any positive integer (e.g, 1, 5, or 10).

The invention relates to systems and methods for allowing a handcuff holder's user to attached and remove handcuffs form the holder in a quick and easy to use way.

As can be appreciated, removal of handcuffs by law enforcement officers is many times done while handling a suspect. Hence, the removal of the handcuffs from its holder has to be done quickly, using a single hand, while moving and without the officer looking at the holder and handcuffs. Similarly, the return of cuffs might also be done under pressure and due to the handcuffs holder's location on a service belt, is done, many time, without the officer able to look at the holder.

Generally speaking, the system and method may allow a holder for handcuffs 100 comprising a polymer body 109 that may have two or more integral spring-like flaps 102. The flaps may be positioned on opposite sides and may be in an extended position while not holding handcuffs.

Upon closing the handcuffs on the holder, a user, such as a law enforcement officer, may feel its way with the handcuffs in hand and fit the not-completely closed handcuffs around the holder's body 106, then the user may close the handcuffs on the body which in turn may cause the flaps to bend inward toward the body while creating pressure outward on the inner part of the handcuffs.

The handcuffs may be held from the back by a connecting plate 105, preventing the handcuffs from slipping backward. The connecting plate may be integral, connected permanently or connected semi-permanently to the body of the holder. The connecting plate may further allow connecting the holder to external articles, for example a police officer's service belt, a wall mount, a car mount, a vest, etc.

As can be appreciated, the handcuffs while mounted on the holder are held from the back by the connecting plate and by the flaps from the sides. To prevent the movement and the slipping of the handcuffs forward while allowing easy mounting of the handcuffs on the holder, a manual safety may be incorporated in the body of the holder.

In some embodiments of the invention, a safety button may be used in order to create a barrier preventing the slipping of the handcuffs while the safety is in its closed position while allowing an uninterrupted removal of the handcuffs while in open position. In the closed position, part of the button itself 103 creates a barrier holding the handcuffs from slipping out.

In further embodiments of the invention, the handcuff holder may have a safety mechanism that may have a safety button 103, a safety spring holder and guide 106 and at least one spring 601. The at least one spring may be adapted to press the button upward, using the spring guide and holder in order to maintain locking of the button in its closed position by pushing it into part of the body that may be adapted to hold it in such closed position. The button itself may be in mechanical connection with said spring holder and springs and further may allow transition from the open to the closed position by pressing down the button, which may unlock it by moving it away from the body part that held the button in its closed position. Then the user may push the button forward to remove the blockade of handcuffs. Such may be achieved using a hinge like movement of the button inside a groove.

In some embodiments of the invention, the button may further have at least one guide 108 adapted to guide the button during the movement between positions.

In other embodiments of the invention, the body 109 may further have a sloped upper portion 104 adapted to guide the handcuffs during their removal from the body. The slope create void between the part of the handcuffs and the body and hence, upon releasing the safety, may cause the easier slipping of the handcuffs from the body.

In other embodiments of the invention, the holder's body may further have a "L" shaped integral spring-like part 107 wherein upon closing of handcuffs on the holder's body may bend upward and create a ledge to prevent the handcuffs from slipping from the body. As the ledge is protruding from the body and the handcuffs are closed on the body, they may be held back allowing blockade and pressure from all sides of the handcuffs—the front upper part is held by the button, the sides are held by the flaps, the front lower part is held by the "L" shaped part and the back part is held by the connecting plate.

Figure 11:
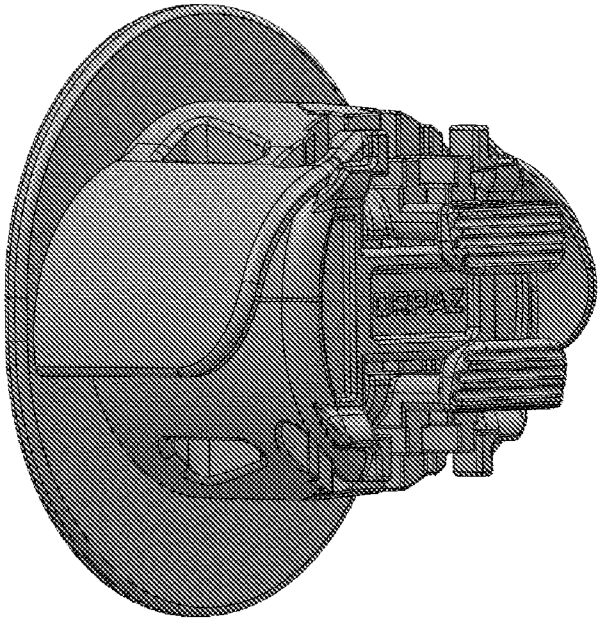
FIG. 11 illustrates embodiment of the present invention having two manual safety mechanisms.
Figure 12:
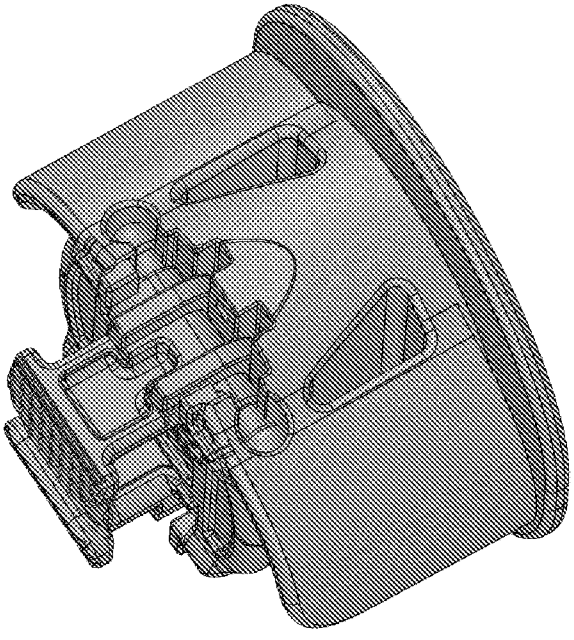
FIG. 12 illustrates embodiment of the present invention having two manual safety mechanisms.
Figure 13A:
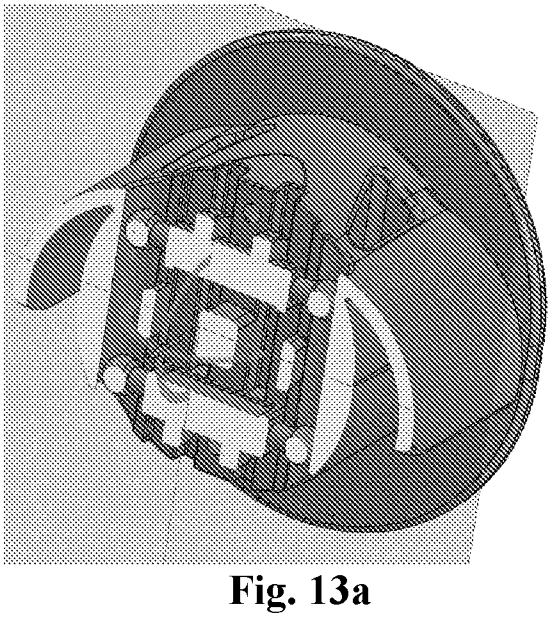
FIG. 13*a*-13*b* illustrates a cross section of an embodiment of the present invention having two manual safety mechanisms.
Figure 13B:
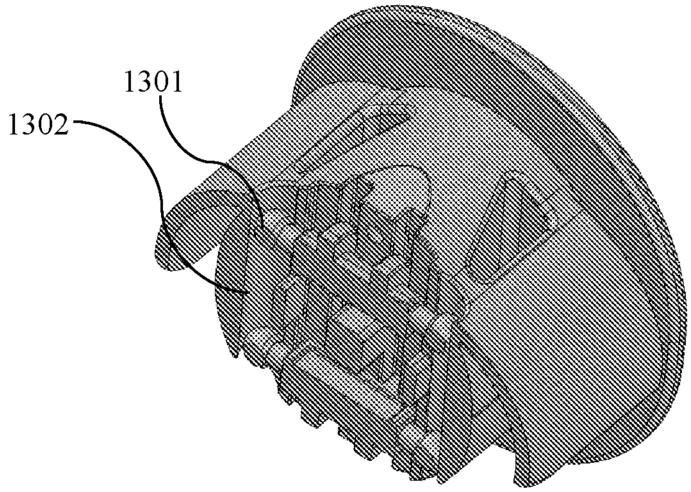

In another embodiment of the invention, the holder may have two manual safety mechanisms as depicted in FIG. 11-13. In further embodiments of the invention, the guides may have orb shaped ends 1301 adapted to slide in matching groves 1302 while having springs pushing the orb shaped ends.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A holder for handcuffs, comprising:

a polymer body having two integral spring-like flaps;

at least one manual safety, embedded within said body, having open and closed positions, wherein the transition from said open to said closed position requires activating a mechanism; and a connecting plate in the back of said body adapted to prevent movement of said handcuffs backward and to allow connecting said holder to external articles, wherein upon closing handcuffs on said holder, said flaps bend inward and create pressure on said handcuffs, and wherein said safety mechanism, while in said closed position, prevents the release of said handcuffs by blocking said handcuffs, and having a safety button, a safety spring holder and guide, and at least one spring adapted to press said button upward to maintain locking of said button, wherein said button is in mechanical connection with said spring holder and the at least one spring, and further wherein transition from said open to said closed position requires pressing down said button to unlock it and then pushing said button forward to remove the blockade of said handcuffs.

2. The holder of claim 1, having two manual safety mechanisms.

3. The holder of claim 2, wherein said button further having at least one guide adapted to guide said button during movement between positions.

4. The holder of claim 3, wherein said at least one guide having orb shaped ends adapted to slide in matching groves.

5. The holder of claim 4, wherein said groves having springs pushing said orb shaped ends.

6. The holder of claim 1, wherein said body is comprises a sloped upper portion to guide said handcuffs during removal of said handcuffs from said body.

7. The holder of claim 1, wherein said body further comprises an "L" shaped integral spring-like part wherein upon closing handcuffs on said holder, said part bend upward forming a ledge to prevent said handcuffs from slipping from said body.

* * * * *